D. B. SIMPSON.
FRICTION BRAKE BAND.
APPLICATION FILED OCT. 21, 1919.
1,351,927.
Patented Sept. 7, 1920.
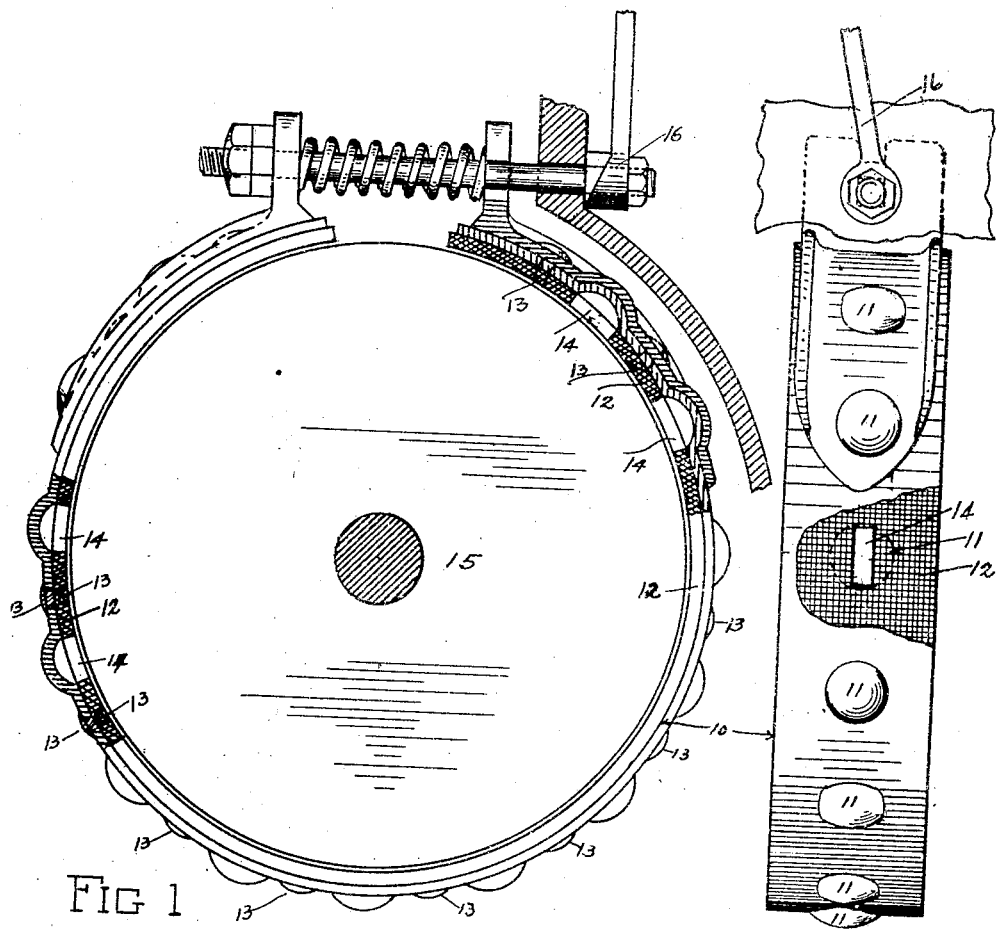
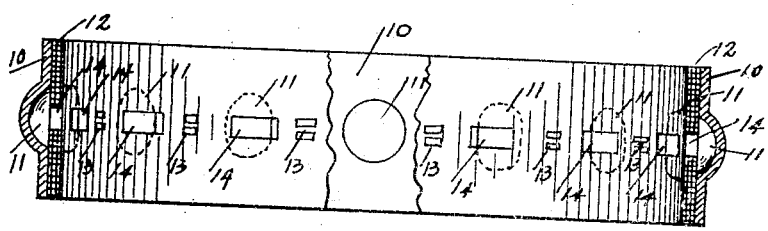
INVENTOR
David B. Simpson
BY
W. G. Charles
ATTORNEY

UNITED STATES PATENT OFFICE.

DAVID B. SIMPSON, OF WICHITA, KANSAS.

FRICTION BRAKE-BAND.

1,351,927.  Specification of Letters Patent.  Patented Sept. 7, 1920.

Application filed October 21, 1919. Serial No. 332,229.

*To all whom it may concern:*

Be it known that I, DAVID B. SIMPSON, a citizen of the United States, and a resident of Wichita, in the county of Sedgwick and State of Kansas, have invented certain new and useful Improvements in Friction Brake-Bands, of which the following is a description, referring to the accompanying drawings, which form a part of this specification.

My invention is applicable to brake bands and clutches which run partly submerged in lubricant, the principal object being to provide means whereby oil is forced on the fabric face of the band as to forcibly impregnate the fabric band with oil while under compression and in contact with the brake drum, thereby preventing burning and charring of the brake band; to provide oil reservoirs on the brake band in registry with functional elements on the fabric lining thereof for accompanying the above purpose.

In the drawings:—

Figure 1 shows the side elevation of a brake band in position upon the brake drum.

Fig. 2 is a rear view of the mechanism seen in Fig. 1 with parts in section for clear understanding of the elements functioning.

Fig. 3 shows a view of the face of the fabric lining with a portion thereof removed to disclose the inner face of the band upon which the band lining is applied.

Similar numerals of reference indicate corresponding parts in all the figures of the drawings.

Referring to the drawings, 10 is a brake band, preferably of metal, provided with a plurality of embossed receptacles 11, arranged at spaced intervals on said band. A fabric lining 12 is seen applied to the inner face of the band 10 and engaged therewith by means of rivets 13. This fabric lining 12 is provided with a plurality of elongated perforations 14 extending longitudinally around the band as seen in the drawings, said perforations corresponding in number to the number of oil receptacles on the band and so arranged that each perforation 14 registers with an oil receptacle 11 as shown.

The band 10 with its lining 12 are shown applied to a brake drum 15 the band 10 being engaged with and disengaged from the drum 15 through cam action 16 operated by means not shown and not essential to the present invention.

When the band 10 is released the lining 12 will separate from the drum face thereby permitting the aforementioned lubricant to flush through between said lining and drum face and thereby enter through the perforation 14 in the lining 12 to fill the receptacles 11 which register with their respective perforations.

Now upon engagement of the brake band 10 through cam action 16, under normal conditions of practice, the oil film as developed between the periphery of the drum 15 and the acting inner face of the lining 12 is soon burned away and the lining soon chars due to the friction of the acting parts. By my invention, however a continuous film of oil is provided, said oil coming from reserve receptacles 11, into which it has previously passed, this oil saturates the lining 12 around a perforation 14 and the band 10 distributes the oil film over the acting face of said lining 12 thereby preventing the burning, which is quite essential for the proper and efficient functioning of the elements in brake band and clutch mechanisms.

Such modifications may be employed as lie within the scope of the appended claims.

Having fully described my invention what I now claim as new and desire to secure by Letters Patent is—

1. In combination, a metallic band and a friction lining secured thereto; said band being provided with a plurality of embossed receptacles arranged at spaced intervals thereupon and said lining being provided with a plurality of perforations arranged longitudinally around said lining so that each perforation through said lining is brought into registry with a corresponding receptacle upon said band for the purpose as specified.

2. In combination with an oil reservoir, a rotating element and a band element and means for effecting engaging and disengaging of said band element including a metallic band and a friction band secured thereto; said metallic band being provided with a plurality of embossed receptacles arranged at spaced intervals thereupon and said lining being provided with a plurality of perforations arranged longitudinally around said lining so that each perforation through said lining is brought into registry with a corresponding receptacle upon said band; said band element during disengagement from said rotating element storing up oil drawn from said reservoir through said perforations and within said receptacles and during engagement of said band element with said rotating element exuding said stored up oil as a lubricant to the acting faces of said lining and rotatable element substantially as specified.

DAVID B. SIMPSON.

Witnesses:
 WM. A. NETHERCOT,
 N. D. WILBUR.